United States Patent
Langhammer

(10) Patent No.: US 7,801,937 B1
(45) Date of Patent: Sep. 21, 2010

(54) METHOD AND APPARATUS FOR IMPLEMENTING A LOOK-AHEAD FOR LOW RADIX MONTGOMERY MULTIPLICATION

(75) Inventor: Martin Langhammer, Southway Alderbury (GB)

(73) Assignee: Altera Corporation, San Jose, CA (US)

( * ) Notice: Subject to any disclaimer, the term of this patent is extended or adjusted under 35 U.S.C. 154(b) by 902 days.

(21) Appl. No.: 10/932,210

(22) Filed: Sep. 1, 2004

(51) Int. Cl.
*G06F 7/00* (2006.01)

(52) U.S. Cl. ..................................................... 708/492

(58) Field of Classification Search .......... 708/491–492
See application file for complete search history.

(56) References Cited

U.S. PATENT DOCUMENTS

| 5,513,133 | A | * | 4/1996 | Cressel et al. | 708/491 |
| 6,963,645 | B2 | * | 11/2005 | Chen et al. | 708/491 |
| 7,111,166 | B2 | * | 9/2006 | Dror et al. | 708/491 |
| 2004/0054705 | A1 | * | 3/2004 | Le Quere | 708/491 |
| 2004/0220989 | A1 | * | 11/2004 | Elbe et al. | 708/492 |
| 2004/0252829 | A1 | * | 12/2004 | Son | 708/491 |

\* cited by examiner

*Primary Examiner*—Chat C Do
(74) *Attorney, Agent, or Firm*—L. Cho

(57) ABSTRACT

A method for performing Montgomery multiplication on n bit numbers includes computing look-ahead partial sum values to generate a Montgomery result after $n/2+1$ iterations of intermediate result computations. According to one embodiment of the present invention, Montgomery multiplication is performed to compute $A*B \bmod M$ where A, B, and M are n-bit numbers.

12 Claims, 3 Drawing Sheets

METHOD AND APPARATUS FOR IMPLEMENTING A LOOK-AHEAD FOR LOW RADIX MONTGOMERY MULTIPLICATION

FIELD

An embodiment of the present invention relates to procedures that may be used for performing modular multiplication. More specifically, an embodiment of the present invention relates to a method and apparatus for implementing a look-ahead for low radix Montgomery multiplication.

BACKGROUND

Public-key cryptography plays an important role in providing confidentiality, authentication, data integrity, and non-repudiation. The Rivest, Shamir, and Adelman (RSA) algorithm is one widely used in cryptography systems. An RSA operation is a modular exponentiation which requires repeated modular multiplications. RSA operand sizes are often 1024-bits or greater in length. This translates to challenges for systems utilizing RSA in achieving high data throughput rates.

Montgomery multiplication is an efficient method for performing modular multiplication with an arbitrary modulus. It is particularly suitable for implementation on general purpose computing systems such as those implemented by field programmable gate arrays (FPGAs). Montgomery multiplication is based on a representation of a residue class modulo M. The algorithm uses simple divisions by a power of two instead of divisions by M, which are used in a conventional modular operation.

Efforts have been made to increase the performance of Montgomery multipliers implemented on general purpose computing systems by using a high radix Montgomery multiply. This typically involved more complex systems that required the use of higher fixed point multipliers which are not available on all FPGA architectures.

Thus, what is needed is an efficient and effective method and apparatus for increasing the performance of Montgomery multipliers implemented on general purpose computing systems.

SUMMARY

According to an embodiment of the present invention, a Montgomery multiplier provides a look-ahead that has the effect of computing multiple iterations of the traditional Montgomery algorithm at once. This allows the Montgomery multiplier to run at least twice as fast as traditional circuits performing Montgomery multiplication. The Montgomery multiplier of the present invention may be implemented without physical multipliers and can be scaled across a wide range of look-ahead depths in parameterized design.

BRIEF DESCRIPTION OF THE DRAWINGS

The features and advantages of the present invention are illustrated by way of example and are by no means intended to limit the scope of the present invention to the particular embodiments shown.

DETAILED DESCRIPTION

Figure 1:
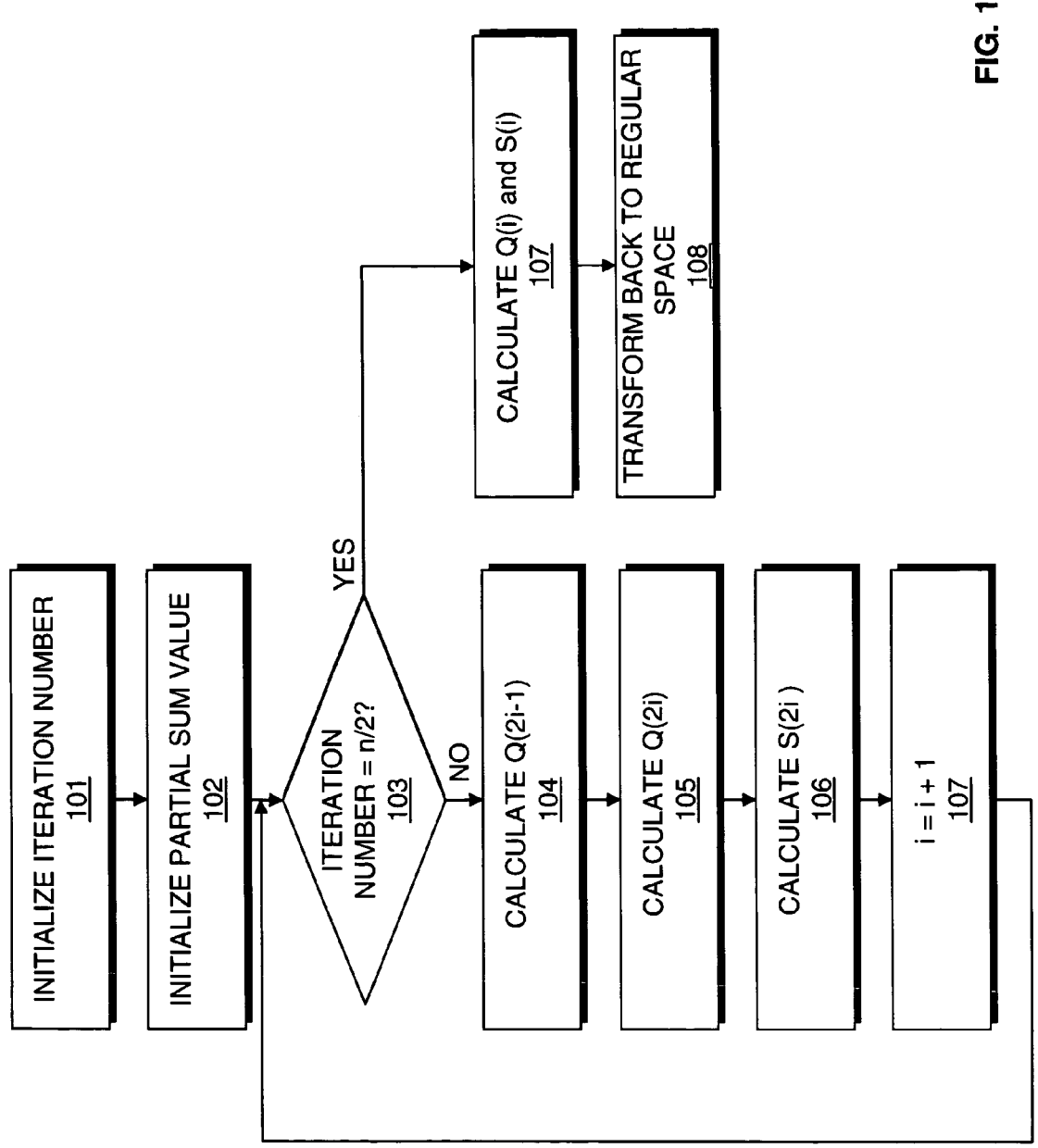
FIG. 1 is a flow chart that illustrates a method for performing Montgomery multiplication according to an embodiment of the present invention.

Montgomery multiplication is based on a representation of a residue class modulo M. Montgomery multiplication may be used to calculate (A*B) mod M, where A, B, and M are n bit numbers. Simple divisions by a power of two are performed instead of divisions by M, which are used in a conventional modular operation. Typically, n iterations of computations that generate intermediate results or partial sum values are performed. One form of the Montgomery multiplication algorithm in radix 2 requires n+1 iterations of the following, where equations (1) and (2) are computations performed in Montgomery space.

$$Q(i)=S(i-1) \bmod 2 \tag{1}$$

$$S(i)=(S(i-1)+Q(i)*M+b(i)*A)/2 \tag{2}$$

It should be appreciated that other forms of the multiplication algorithm in radix 2 may also be used.

In equation (2), b(i) are individual bits of B from the least significant bit (LSB) up. S(i) may be referred to as an intermediate result or partial sum value and Q(i) may be referred to as a partial quotient value. At i=0, S(0) is initialized to 0. After n iterations of equations (1) and (2) where i represents the iteration number, the partial sum value is designated as a Montgomery result that is transformed from Montgomery space back to normal space. This may be done by multiplying by "1" in Montgomery space.

Equation (2) may be re-expressed below to show the next iteration at i+1.

$$S(i+1)=(S(i)+Q(i+1)*M+b(i+1)*A)/2 \tag{3}$$

Equation (1) may be re-expressed below to show the next iteration at i+1.

$$Q(i+1)=S(i) \bmod 2 \tag{4}$$

Equation (2) may be substituted into equation (4) to yield the following relationship.

$$Q(i+1)=[(S(i-1)+Q(i)*M+b(i)*A)/2] \bmod 2 \tag{5}$$

Equations (2) and (5) may be substituted into equation (3) to yield the following relationship.

$$\begin{aligned} S(i+1) = & \\ ([S(i-1)+Q(i)*M+b(i)*A]/2 + [([S(i-1)+Q(i)*M+b(i)*A]/ \\ 2) \bmod 2]*M+b(i+1)*A)/2 \end{aligned} \tag{6}$$

Where X and Y are substituted for Q(i) and Q(i+1) equation (6) may be represented by the following relationship.

$$S(i+1)=([S(i-1)+X*M+b(i)*A]/2+Y*M+b(i+1)*A)/2 \tag{7}$$

Equation (6) represents a look-ahead of a partial sum value that is computed during a next iteration i+1. According to an embodiment of the present invention, the look-ahead of a partial sum value may be computed during every iteration, allowing a Montgomery multiplier to skip every other iteration and save a significant amount of time. Thus, instead of computing n+1 iterations of equations (1) and (2), n/2 iterations of equations (5) and (6) may be computed and a final iteration of equations (1) and (2) is computed, where i is the iteration number. After n/2 iterations of equations (5) and (6), the partial sum value generated from equation (6) is designated as a Montgomery product. The Montgomery product may be transformed from Montgomery space to normal space as the solution to A*B mod M.

According to an embodiment of the present invention Q(i), as represented in equation (1), may be computed with the LSB of S(i−1). According to a further embodiment of the present invention Q(i+1), as represented in equation (5), may be computed using the 2 LSBs of S(i−1), M, and A, and a single bit of B. The function "mod 2" may be computed by taking the LSB of an expression in equation (5). However, because the expression is also divided by 2, the second least significant bit (2 LSB) of the expression is taken. The sum out of the LSB position is not required. Only the carry out of the LSB position is required.

Equations (5) and (6) may be further expressed as equations (7) and (8), respectively, when using a loop index of i=1 to n/2.

$$Q(2i)=[(S(2i-2)+Q(2i-1)*M+b(2i-1)*A)/2] \bmod 2 \quad (8)$$

$$S(2i) = ([S(2i-2) + Q(2i-1)*M + b(2i-1)*A]/2 + [ \quad (9)$$
$$([S(2i-2) + Q(2i-1)*M + b(2i-1)*A]/2) \bmod 2] *$$
$$M + b(2i)*A)/2$$

Similarly, referring to equations (8) and (9), Q(2i−1) may be computed with the LSB of S(2i−2). Q(2i) may be computed using the 2 LSBs of S(2i−2), M, and A, and a single bit of B. The function "mod 2" may be computed by taking the LSB of an expression in equation (7). However, because the expression is also divided by 2, the second LSB of the expression is taken. The sum out of the LSB position is not required. Only the carry out of the LSB position is required.

FIG. 1 is a flow chart that illustrates a method for performing Montgomery multiplication according to an embodiment of the present invention. The operation A*B mod M is performed where A, B and M are n bit numbers. At 101, the iteration number i is set to 1.

At 102, the partial sum value S(i) for i=0 is initialized as 0.

At 103, it is determined whether the iteration number i is greater than n/2. If the iteration number i is not greater than n/2, control proceeds to 104. If the iteration number is greater than n/2, control proceeds to 108.

At 104, the partial quotient value, Q(2i−1), is calculated. According to an embodiment of the present invention, the partial quotient value, Q(2i−1), is calculated as being the LSB of S(2i−2).

At 105, the subsequent partial quotient value, Q(2i), is calculated. According to an embodiment of the present invention, the subsequent partial quotient value, Q(2i), is calculated using the 2 LSB of S(2i−2), M, and A, and a single bit of B. In this embodiment, the 2 LSB of S(2i−2) may be ANDed with the 2 LSB of M to generate a first product. The 2 LSB of A may be ANDed with b(2i−1) to generate a second product. The first and second product may be summed with the 2 LSB of S(2i−2) and shifted to the right.

At 106, the subsequent partial sum value, S(2i) is calculated. According to an embodiment of the present invention, S(2i) may be determined to be ([S(2i−2)+Q(2i−1)*M+b(2i−1)*A]/2+[([S(2i−2)+Q(2i−1)*M+b(2i−1)*A]/2) mod 2]*M+b(2i)*A)/2. According to an embodiment of the present invention S(2i) is the same as S(i+1). S(i+1) is the partial sum at any point relative to a previous partial sum. S(2i) is the indexes used for calculating the sum in the loop described by equations (8) and (9).

At 107, the iteration number i is updated to be i+1. Control returns to 104.

At 108, a final iteration of equations (1) and (2) is performed to update the partial sum value.

At 109, the partial sum value is determined to be the Montgomery result. The Montgomery result is transformed back from Montgomery space to normal space.

FIG. 1 is a flow chart illustrating a method for performing Montgomery multiplication according to an embodiment of the present invention. Some of the techniques illustrated in this figure may be performed sequentially, in parallel or in an order other than that which is described. It should be appreciated that not all of the techniques described are required to be performed, that additional techniques may be added, and that some of the illustrated techniques may be substituted with other techniques.

The following pseudo code listed below may be used to implement 101-107 illustrated in FIG. 1.

S0 = 0

FOR i = 1 to n/2 Do

Q(2i − 1) = S(2i − 2) mod 2

$$Q(2i) = [(S(2i-2) + Q(2i-1)*M + b(2i-1)*A)/2] \bmod 2$$

$$S(2i) = ([S(2i-2) + Q(2i-1)*M + b(2i-1)*A]/2 + [$$
$$([S(2i-2) + Q(2i-1)*M + b(2i-1)*A]/2) \bmod 2] *$$
$$M + b(2i)*A)/2$$

END FOR

Q(n + 1) = S(n) mod 2

$$S(n + 1) = (S(n) + Q(n + 1)*M + b(n + 1)*A)/2$$

It should be appreciated that b(n+1) is 0 as b is an n bit number. Therefore, S(n+1) may be further reduced to (S(n)+Q(n+1)*M)/2.

Figure 2:
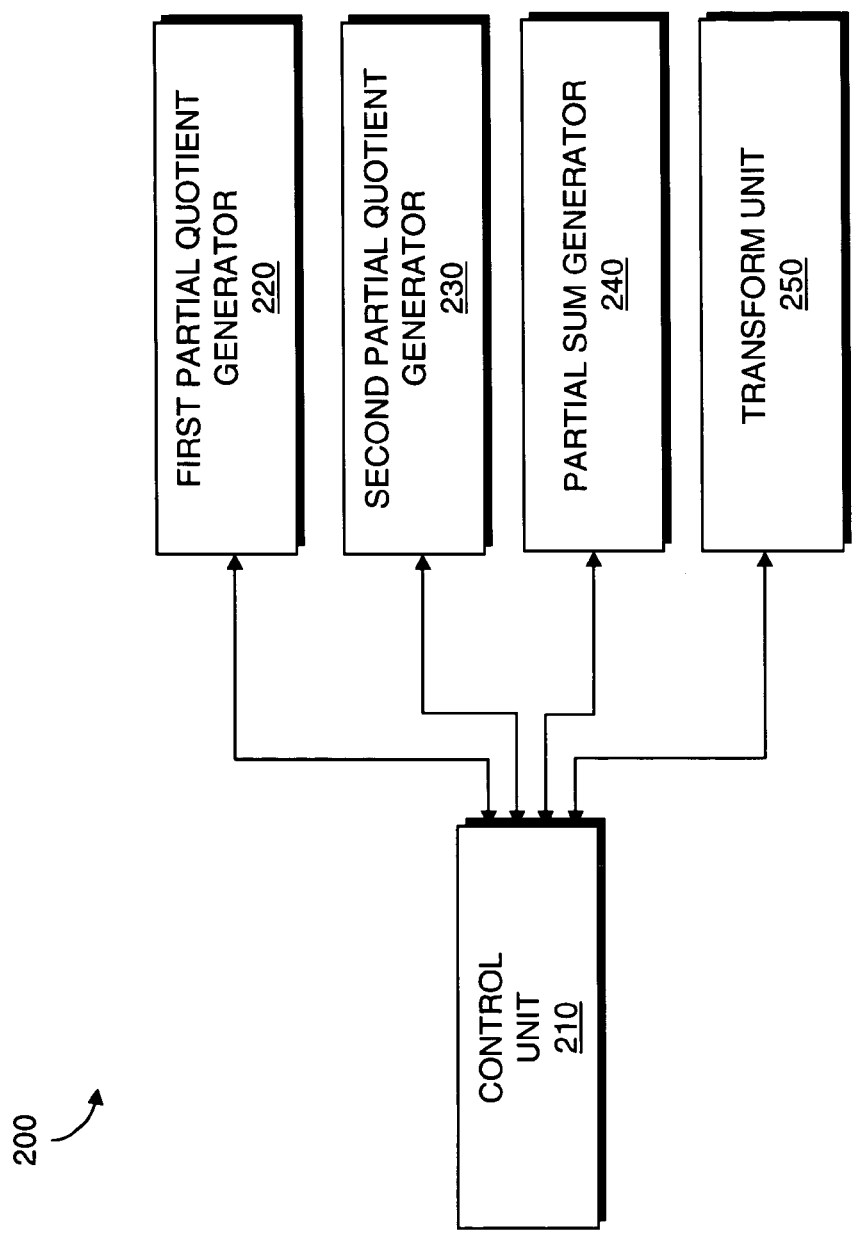
FIG. 2 illustrates a Montgomery multiplier according to an embodiment of the present invention.

FIG. 2 illustrates a Montgomery multiplier 200 according to an embodiment of the present invention. The Montgomery multiplier 200 operates to compute a Montgomery result that may be used to determine A*B mod M. The Montgomery multiplier 200 includes a control unit 210. The control unit 210 communicates and manages operation of the other components in the Montgomery multiplier 200. According to an embodiment of the Montgomery multiplier 200, the control unit 210 receives and stores values of A, B, M, and past and present partial sum values, S(i).

The Montgomery multiplier 200 includes a first partial quotient generator 220. The first partial quotient generator 210 computes a value Q(i). The value Q(i) is equal to S(i−1) mod 2. According to an embodiment of the present invention, the first partial quotient generator 210 generates a partial quotient value, Q(i), from the LSB of a previous partial sum value S(i−1).

The Montgomery multiplier 200 includes a second partial quotient generator 230. The second partial quotient generator 230 computes a subsequent partial quotient value Q(i+1). The value Q(i+1) is equal to Q(i+1)=[(S(i−1)+Q(i)*M+b(i)*A)/2] mod 2. According to an embodiment of the present invention, the second partial quotient generator 230 generates the subsequent partial quotient value, Q(i+1) using the 2 LSB of S(i−1), M, and A, and a single bit of B.

The Montgomery multiplier 200 includes a partial sum generator 240. The partial sum generator 230 computes a look-ahead or subsequent partial sum value S(i+1). The value S(i+1) is equal to ([S(i−1)+Q(i)*M+b(i)*A]/2+[([S(i−1)+Q(i)*M+b(i)*A]/2) mod 2]*M+b(i+1)*A)/2, which is a function of Q(i) and Q(i+1).

The control unit 210 directs the first and second partial quotient generators 220 and 230 and partial sum generator 240 to perform computations as described in the pseudo code to generate the value S(n+1).

The Montgomery multiplier 200 includes a transform unit 250. In response to the control unit 210, the transform unit 250 transforms the Montgomery product from Montgomery space to normal space. This may be achieved, for example, by multiplying the Montgomery product by "1" in Montgomery space.

According to an embodiment of the present invention, the control unit 210, first partial quotient generator 220, second partial quotient generator 230, partial sum generator 240, and transform unit 250 may be implement using any known circuitry or technique. In one embodiment, the control unit 210, first partial quotient generator 220, second partial quotient generator 230, partial sum generator 240, and transform unit 250 all reside on a single semiconductor substrate. This semiconductor substrate may be, for example, an FPGA chip.

Figure 3:
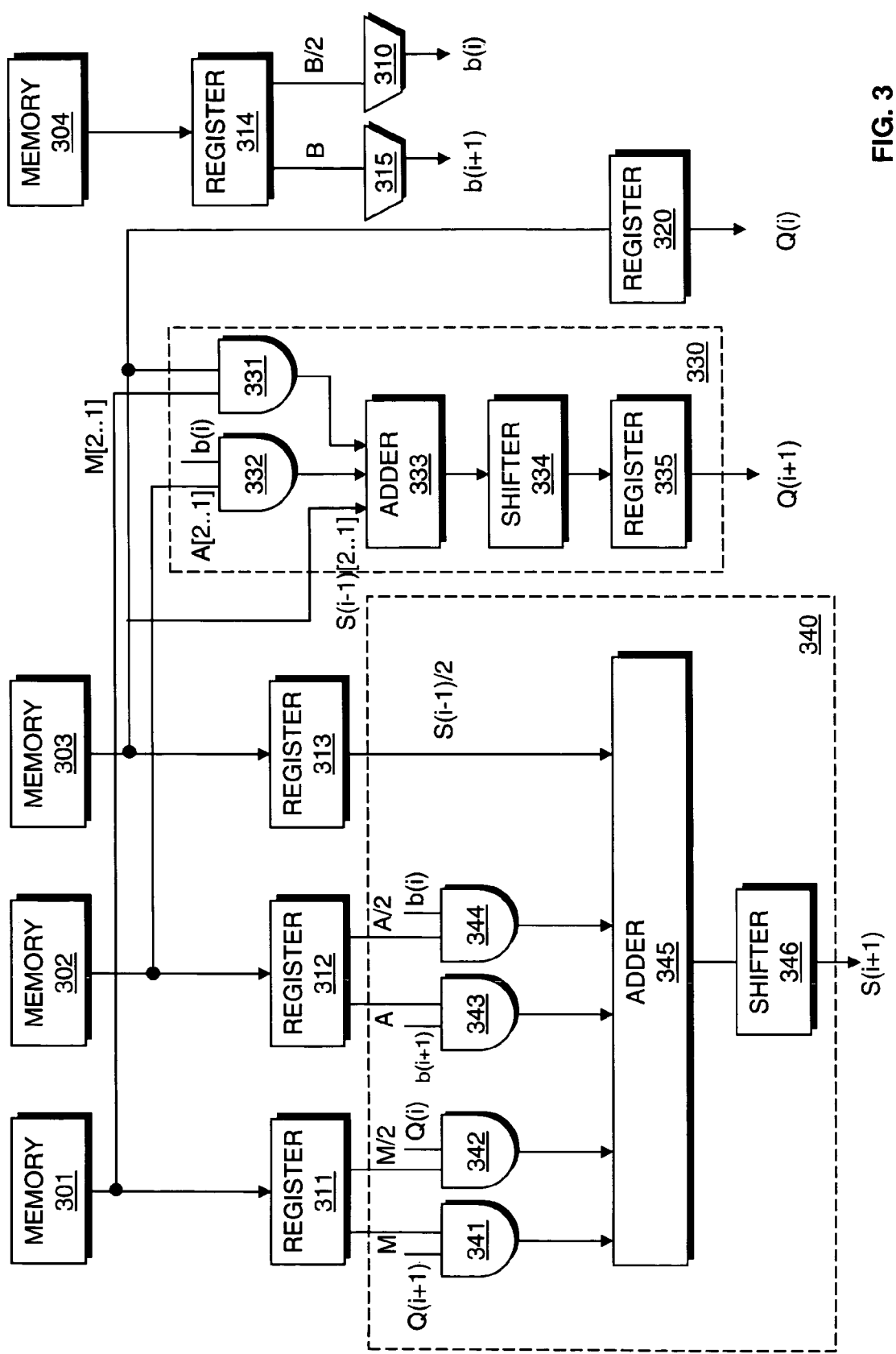
FIG. 3 illustrates a partial sum calculator according to an embodiment of the present invention.

FIG. 3 illustrates a partial sum calculator 300 according to an embodiment of the present invention. Components in the partial sum calculator 300 may be used to implement the Montgomery multiplier 200 shown in FIG. 2. According to an embodiment of the present invention, the partial sum calculator 300 may be used to implement components 220, 230, and 240 of the Montgomery multiplier 200 in FIG. 2. The partial sum calculator 300 generates a subsequent partial sum value S(i+1) that may be used to compute A*B mod M. The partial sum calculator 300 includes a plurality of memories 301-304. The memories 301-304 store M, A, partial sum, and B values, respectively.

Each of the memories 301-304 is coupled to a register 311-314. The registers 311-314 receive a value from each of the memories 301-304 and is capable of outputting the value on a first line and the value divided by two on a second line. Register 311 receives a value M and outputs M and M/2. Register 312 receives a value A and outputs A and A/2. Register 313 receives a value S(i−1) and outputs S(i−1) and S(i−1)/2. Register 314 receives B and outputs B and B/2. The outputs B and B/2 and sent to multiplexers 315 and 316 which output the i+1th bit from the LSB of B and the ith bit from the LSB of B respectively. b(i) are individual bits of B from the LSB up.

The partial sum calculator 300 includes a first partial quotient generator 320. The first partial quotient generator 320 may be used to implement the first partial quotient generator 220 shown in FIG. 2. The first partial quotient generator 320 is coupled to the memory 303 and generates and registers a partial quotient value Q(i) from the LSB of a previous partial sum value S(i−1).

The partial sum calculator 300 includes a second partial quotient generator 330. The second partial quotient generator 330 may be used to implement the second partial quotient generator 230 shown in FIG. 2. The second partial quotient generator 330 is coupled to the memories 301-303, and multiplexer 316 and generates a subsequent partial quotient value Q(i+1) from the 2 LSBs of S(i−1), M, A, and the LSB of B. The second partial quotient generator 330 includes a first AND gate 331 that performs an AND function between the 2 LSB of S(i−1) and the 2 LSB of M to generate a first product. The second partial quotient generator 330 includes a second AND gate 332 that performs an AND function between the 2 LSB of A and a bit of B to generate a second product. The second partial quotient generator 330 includes an adder 333 that sums the first and second products with the 2 LSB of S(i−1). The second partial quotient generator 330 includes a shifter 334 that performs a right shift on the sum and a register 335 that registers the result. It should be appreciated that the 2 LSB is the second least significant bit and 2 LSBs are the 2 least significant bits (2 lowest bits).

The partial sum calculator 300 includes a partial sum generator 340. The partial sum generator 340 may be used to implement the partial sum generator 240 shown in FIG. 2. The partial sum generator 340 includes an AND gate 341 that performs an AND function on a subsequent partial quotient value generated by the second partial quotient generator 330 and M. The partial sum generator 340 includes an AND gate 342 that performs an AND function on a partial quotient value generated by the first partial quotient generator 320 and M/2. The partial sum generator 340 includes an AND gate 343 that performs an AND function on the 2 bits from B extracted by multiplexer 315 and A. The partial sum generator 340 includes an AND gate 344 that performs an AND function on A/2 and the bits of B extracted from multiplexer 316. The partial sum generator 340 includes an adder 345 that sums the outputs of the AND gates 341-344. The adder 345 may be implemented, for example, by a ripple carry adders and a compressor or with other components. The partial sum generator 340 includes a shifter 346 that performs a right shift to the sum.

FIGS. 2 and 3 describe the Montgomery multiplier 200 and the partial sum calculator 300 performing computations of the partial sum value and the partial quotient value with respect to equations (1)-(6). It should be appreciated that the Montgomery multiplier 200 and the partial sum calculator 300 could have easily been described performing computations of the partial sum value and the partial quotient value with respect to equations (7) and (8).

The partial sum calculator 300 computes subsequent or look-ahead partial sum values that may be used to increase the speed of Montgomery multiplication. Compared to traditional Montgomery multipliers, the partial sum calculator 300 utilizes only a few additional adders. The computation of Q(i+1) or Q(2i) would require, at most, 1 additional clock. The extra pipe depth for the addition may also require an additional clock. In the case of a 2048 bit number with a 64 bit FPGA core, 32 clocks (plus a pipe depth of 6 clocks) may be required per iteration. The pipe depth would not affect each iteration as a next iteration may start before a previous iteration is finished. This may be so when the number of clocks per iteration is greater than the pipe depth. It should be appreciated that the partial sum calculator 300 may be expanded to 3 or more levels.

Embodiments of the present invention (e.g. exemplary process described with respect to FIGS. 1 and 3) may be provided as a computer program product, or software, that may include a machine-readable medium having stored thereon instructions. The machine-readable medium may be used to program a computer system or other electronic device. The machine-readable medium may include, but is not limited to, floppy diskettes, optical disks, CD-ROMs, and magneto-optical disks, ROMs, RAMs, EPROMs, EEPROMs, magnetic or optical cards, flash memory, or other type of media/machine-readable medium suitable for storing electronic instructions.

In the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A Montgomery multiplier circuitry implemented on a semiconductor substrate to compute A*B mod M, the Montgomery multiplier including a partial sum calculator to compute partial sum values to generate a Montgomery result for n bit numbers after $n/2+1$ iterations of intermediate result computations wherein A, B, and M are n-bit numbers, the partial sum calculator comprises:
a first partial quotient generator to generate partial quotient values;
a second partial quotient generator to generate subsequent partial quotient values; and
a partial sum generator to generate the Montgomery result after $n/2+1$ iterations of intermediate result by performing radix 2 multiplication computations from the first and second partial quotient generators, the partial sum generator including a first AND gate that performs an AND function on a subsequent partial quotient value generated by the second partial quotient generator and M, a second A gate that performs an AND function on a partial quotient value generated by the first partial quotient generator and M/2, a third AND gate that performs an AND function on 2 LSB bits from B and A, and a fourth AND gate that performs an AND function on a LSB bit from B and A/2.

2. The apparatus of claim 1, wherein the first partial quotient generator generates a partial quotient values from the relationship $Q(i)=S(i-1) \mod 2$, wherein Q is a partial quotient value and S is a partial sum value,
the second partial quotient generator generates a subsequent partial quotient values from the relationship $Q(i+1)=[(S(i-1)+Q(i)*M+b(i)*A)/2] \mod 2$, wherein b is an individual bit of B, and
the partial sum generator generates the Montgomery result after $n/2+1$ iterations of intermediate result computations from the first and second partial quotient values from the relationship $S(i+1)=([S(i-1)+X*M+b(i)*A]/2+Y*M+b(i+1)*A)/2$, wherein X is $Q(i)$ and Y is $Q(i+1)$.

3. The apparatus of claim 1, wherein the first partial quotient generator comprises a register and registers a partial quotient value $Q(i)$ from a least significant bit (LSB) of a previous partial sum value $S(i-1)$.

4. The apparatus of claim 1, wherein the second partial quotient generator generates a subsequent partial quotient value $Q(i+1)$ from the 2 least significant bits (LSBs) of $S(i-1)$, M, A, and a bit of B.

5. The apparatus of claim 1, wherein the second partial quotient generator comprises:
a first AND gate that performs an AND function between the least significant bit (LSB) of $S(i-1)$ and the 2 LSB of M to generate a first product;
a second AND gate that performs an AND function between the 2 LSBs of A and a bit of B to generate a second product;
an adder that sums the first and second products with the 2 LSBs of $S(i-1)$; and
a shifter that performs a right shift on the sum.

6. The apparatus of claim 1, wherein the first partial quotient generator generates a partial quotient value $Q(i)$ where $Q(i)$ is equal to $S(i-1) \mod 2$.

7. The apparatus of claim 1, wherein the first partial quotient generator generates a partial quotient value $Q(i)$ where $Q(i)$ is computed from the LSB of a previous partial sum value $S(i-1)$.

8. The apparatus of claim 1, wherein the second partial quotient generator generates a subsequent partial quotient value $Q(i+1)$ where $Q(i+1)$ is equal to $[(S(i-1)+Q(i)*M+b(i)*A)/2] \mod 2$.

9. The apparatus of claim 1, wherein the partial sum generator generates the Montgomery result $S(i+1)$ where $S(i+1)$ is equal to $([S(i-1)+Q(i)*M+b(i)*A]/2+[([S(i-1)+Q(i)*M+b(i)*A]/2) \mod 2]*M+b(i+1)*A)/2$, wherein Q is a partial quotient value, S is a partial sum value, and b is an individual bit of B.

10. The apparatus of claim 1, further comprising:
an adder that sums the outputs of the first, second, third, and fourth AND gates; and
a shifter that performs a right shift to the sum.

11. A Montgomery multiplier circuitry implemented on a semiconductor substrate to compute A*B mod M from partial sum values where A, B, and M are n-bit numbers, comprising:
a first partial quotient generator to generate partial quotient values where the partial quotient generator includes a register to register a partial quotient value $Q(i)$ from a least significant bit (LSB) of a previous partial sum value $S(i-1)$;
a second partial quotient generator to generate subsequent partial quotient values where the second partial quotient generator includes a first AND gate that performs an AND function between the LSB of $S(i-1)$ and the 2 LSB of M to generate a first product, a second AND gate that performs an AND function between the 2 LSBs of A and a bit of B to generate a second product, an adder that sums the first and second products with the 2 LSBs of $S(i-1)$, and a shifter that performs a right shift on the sum; and
a partial sum generator to generate the Montgomery result after $n/2+1$ iterations of intermediate result computations of partial sum values from the first and second partial quotient generators performing radix 2 multiplication where the partial sum generator includes a first AND gate that performs an AND function on a subsequent partial quotient value generated by the second partial quotient generator and M, a second AND gate that performs an AND function on a partial quotient value generated by the first partial quotient generator and M/2, a third AND gate that performs an AND function on 2 LSB bits from B and A, and a fourth AND gate that performs an AND function on a LSB bit from B and A/2.

12. The apparatus of claim 11, wherein the partial sum generator generates the Montgomery result by performing radix 2 multiplication.

* * * * *